(12) United States Patent
Chan (10) Patent No.: US 7,195,324 B2
(45) Date of Patent: Mar. 27, 2007

(54) DISC STORAGE UNIT

(75) Inventor: Sik-Leung Chan, New Territories (HK)

(73) Assignee: C. C. & L Company Limited, Hong Kong (HK)

( * ) Notice: Subject to any disclaimer, the term of this patent is extended or adjusted under 35 U.S.C. 154(b) by 197 days.

(21) Appl. No.: 10/775,708

(22) Filed: Feb. 10, 2004

(65) Prior Publication Data

US 2005/0174018 A1    Aug. 11, 2005

(51) Int. Cl.
*A47B 81/06* (2006.01)

(52) U.S. Cl. ..................... 312/9.38; 312/9.29

(58) Field of Classification Search ........... 312/9.1, 312/9.9, 9.11, 9.12, 9.15, 9.16, 9.19, 9.23, 312/9.29, 9.31, 9.32, 9.34, 9.36, 9.38, 9.53, 312/9.54, 9.55, 9.64, 304, 305, 319.5, 319.6, 312/319.7, 321, 325; 200/18, 1 B, 552; 369/36.01
See application file for complete search history.

(56) References Cited

U.S. PATENT DOCUMENTS

| | | | | |
|---|---|---|---|---|
| 1,878,659 A | * | 9/1932 | Bader | 312/9.13 |
| 4,177,363 A | * | 12/1979 | Keranen | 200/5 B |
| 4,695,990 A | * | 9/1987 | Kawakami | 369/30.85 |
| 5,584,544 A | * | 12/1996 | Kuzara | 312/9.36 |
| 5,790,485 A | * | 8/1998 | Bando | 369/31.01 |
| 6,024,215 A | | 2/2000 | Leung | |
| 6,048,042 A | | 4/2000 | Chan | |
| 6,215,264 B1 | * | 4/2001 | Ma | 318/293 |
| 6,238,022 B1 | * | 5/2001 | Chan | 312/9.11 |

* cited by examiner

*Primary Examiner*—James O. Hansen
*Assistant Examiner*—Philip Gabler
(74) *Attorney, Agent, or Firm*—Alix, Yale & Ristas, LLP (57) ABSTRACT

A disc storage unit includes a case, a tray supported by the case and configured to support an array of discs in respective parallel vertical planes across which respective coaxial axes of the discs pass horizontally. There is a disc-raising mechanism having a finger activatable to lift one of the discs from the tray within its respective plane to thereby render that disc non-coaxial with other discs that might be supported by the tray. The storage unit also includes an indexing mechanism that is configured to cause the disc-raising mechanism to raise others of the discs in a like manner. This enables labels of the raised discs to be viewed for selection by a user.

3 Claims, 16 Drawing Sheets

DISC STORAGE UNIT

BACKGROUND OF THE INVENTION

The present invention relates to a storage unit for retaining a plurality of CDs, DVDs, VCDs and/or the like. More particularly, although not exclusively, the invention relates to a storage unit for such discs capable of holding the discs in parallel vertical planes and mechanically shifting one or more non-adjacent ones of the discs within their respective planes to viewing/selecting/retrieval positions.

It is known to provide storage units for multiple discs either with or without their point-of-sale packages. The out-of-package units usually comprise some form of folder or lidded compartment having sleeves therein somewhat like the pages of a book connected to a spine and into which the discs are inserted. To find a particular disc for retrieval, the sleeves are flipped over somewhat like turning the page of a book until the disc is found. This can be a time-consuming process, often leading to frustration, as the pages must be turned one-by-one.

Other storage units store the discs in their point-of-sale packages, but this is generally not very space-efficient.

OBJECTS OF THE INVENTION

It is an object of the present invention to overcome or substantially ameliorate at least one of the above disadvantages and/or more generally to provide an improved disc storage unit.

DISCLOSURE OF THE INVENTION

There is disclosed herein a disc storage unit comprising:
a case,
a tray supported by the case and configured to support an array of discs in respective parallel substantially vertical planes across which respective coaxial axes of the discs pass substantially horizontally,
a disc-raising mechanism comprising a finger activatable to lift one of the discs from the tray within its respective plane to thereby render the disc non-coaxial with other discs that might be supported by the tray, and
an indexing mechanism configured to cause the disc-raising mechanism to raise others of said discs in a like manner.

Preferably the disc-raising mechanism comprises a pivot bar to which there is slidably mounted a carriage beam from which there extends a plurality of said fingers.

Preferably the fingers are curved to substantially follow an arc of the periphery of the discs.

Preferably the disc storage unit further comprises an electric motor for pivoting the pivot bar.

Preferably the disc storage unit further comprises a gearbox that reduces output speed of the electric motor and drives the pivot bar.

Preferably the gearbox is belt-driven by the motor.

Preferably the gearbox comprises an output gear having an eccentric pin to which a link is attached, and the pivot bar has extending from it a crank arm to which the link is attached.

Preferably the indexing mechanism comprises a shaft extending parallel to the pivot bar and driven by the output gear and having one or more indexing rings affixed thereto and extending thereabout, and a block interacting with the carriage beam and having a plurality of indexing pins extending therefrom and with which the rings interact to transfer the block and thereby the carriage beam linearly along the pivot bar.

Preferably the block is mounted to slide upon a rod that extends parallel to the pivot bar.

Preferably the disc storage unit further comprises a disc positioner affixed to the case and comprising a plurality of slots through which individual discs pass.

Preferably the disc storage unit further comprises a cover attached hingedly to the case and covering any discs stored therein.

Preferably the fingers are spaced equally along the pivot bar to co-operate with every $n^{th}$ disc, where n is an integer greater than or equal to 2.

Preferably the disc storage unit further comprises a switch mechanism comprising two momentary switches, a slide switch and two push buttons, one of the momentary switches activatable by one of the pushbuttons and the other momentary switches activatable by the other pushbutton, the slide switch being activatable by both pushbuttons, wherein the switch mechanism controls the electric motor.

Preferably the switch mechanism further comprises a pair of pivotable elbows, each elbow having one arm co-operating with one of the pushbuttons and one of the momentary switches and another arm co-operating with the slide switch.

Preferably there is a cam mounted on the shaft and a limit switch interacting with the cam.

Preferably the disc storage unit a first safety switch associated with the motor and closed upon closing the cover.

Preferably, the disc storage unit further comprises a second safety switch in series with the first safety switch and associated with the disc-raising mechanism and closed when one of the discs is raised from the tray.

BRIEF DESCRIPTION OF THE DRAWINGS

Preferred forms of the present invention will now be described by way of example with reference to the accompanying drawings, wherein.

DESCRIPTION OF THE PREFERRED EMBODIMENT

Figure 5:
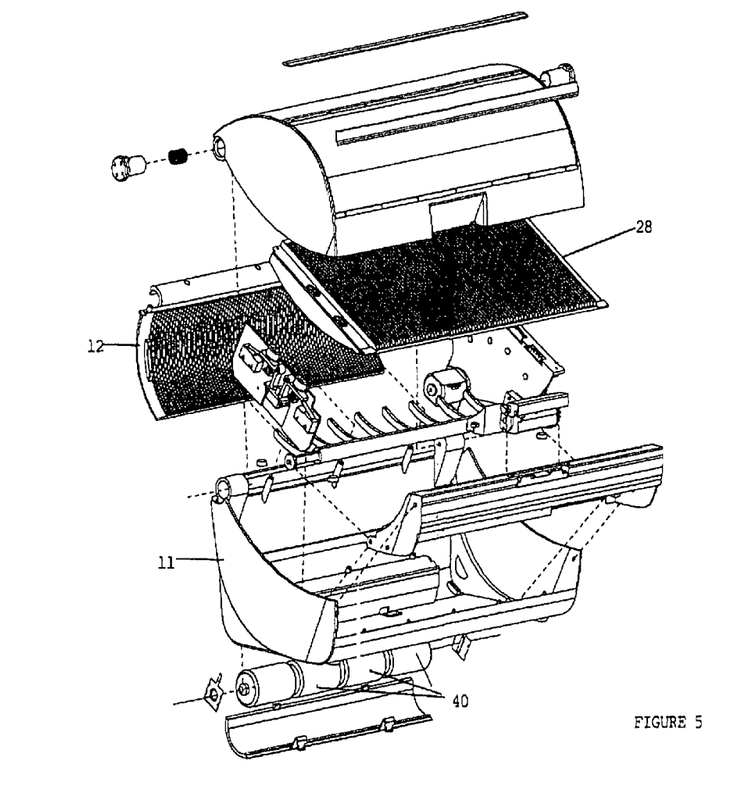
FIG. 5 is a schematic parts-exploded oblique illustration of the case of the storage unit showing parts of the disc-raising mechanism therein.
Figure 6:
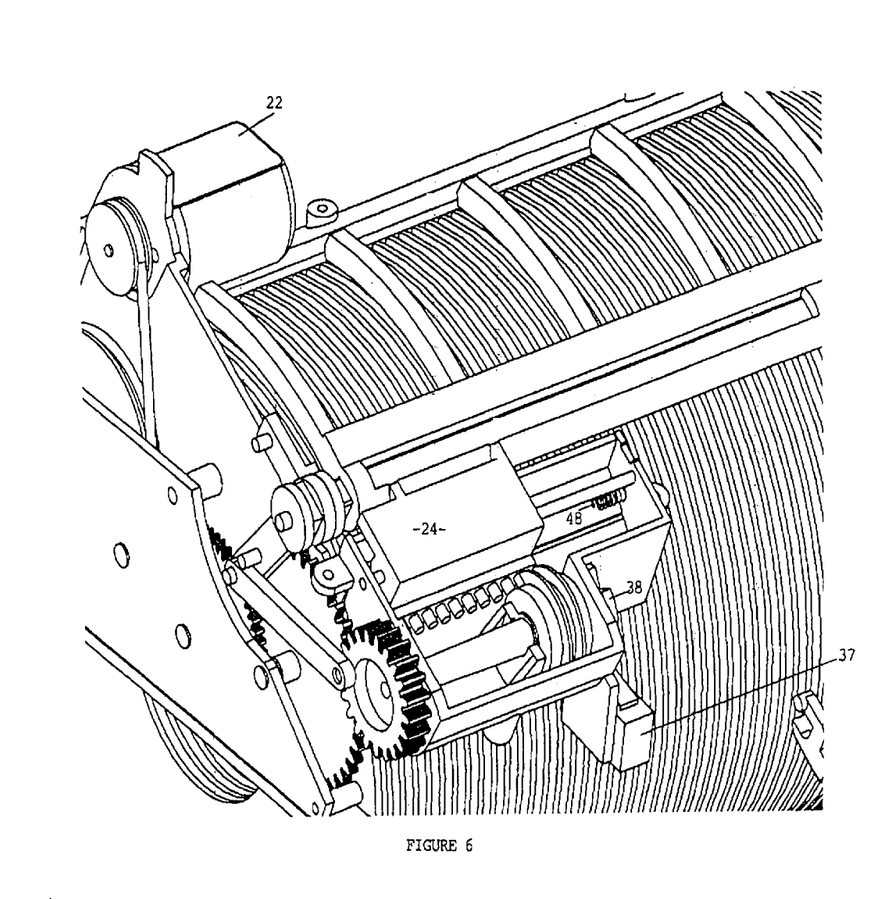
FIG. 6 is a schematic oblique illustration of the parts shown in FIG. 4 after assembly.
Figure 7:
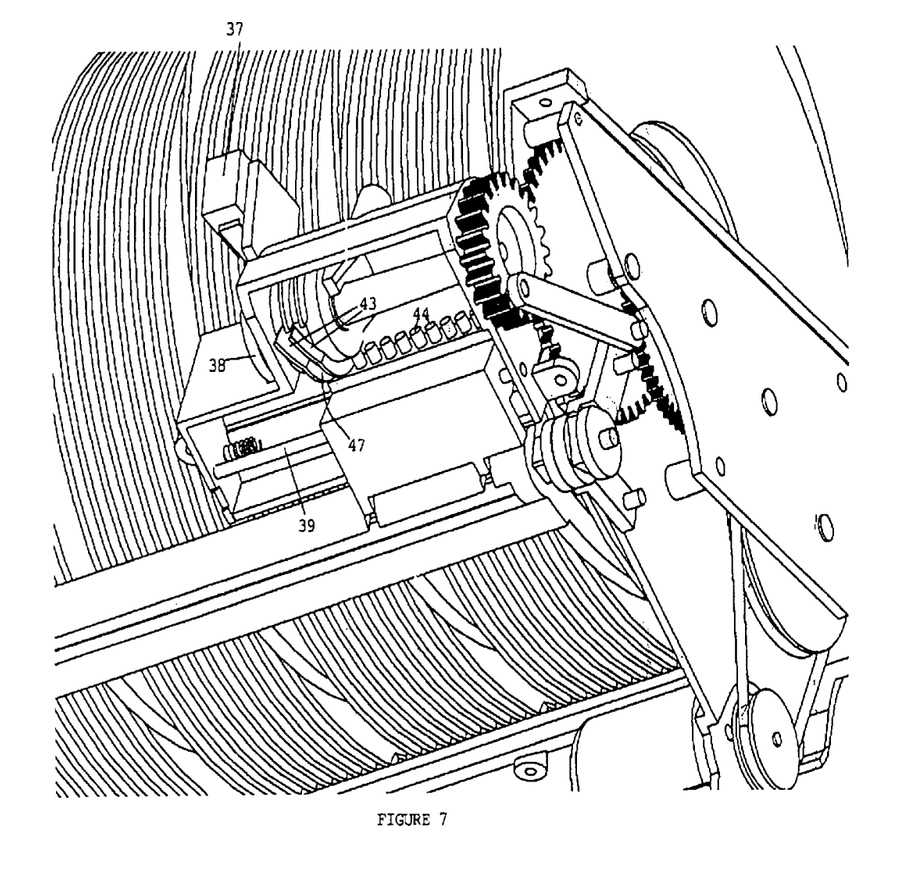
FIGS. 7 and 8 are alternative schematic oblique illustrations of the parts shown in FIG. 6.
Figure 8:
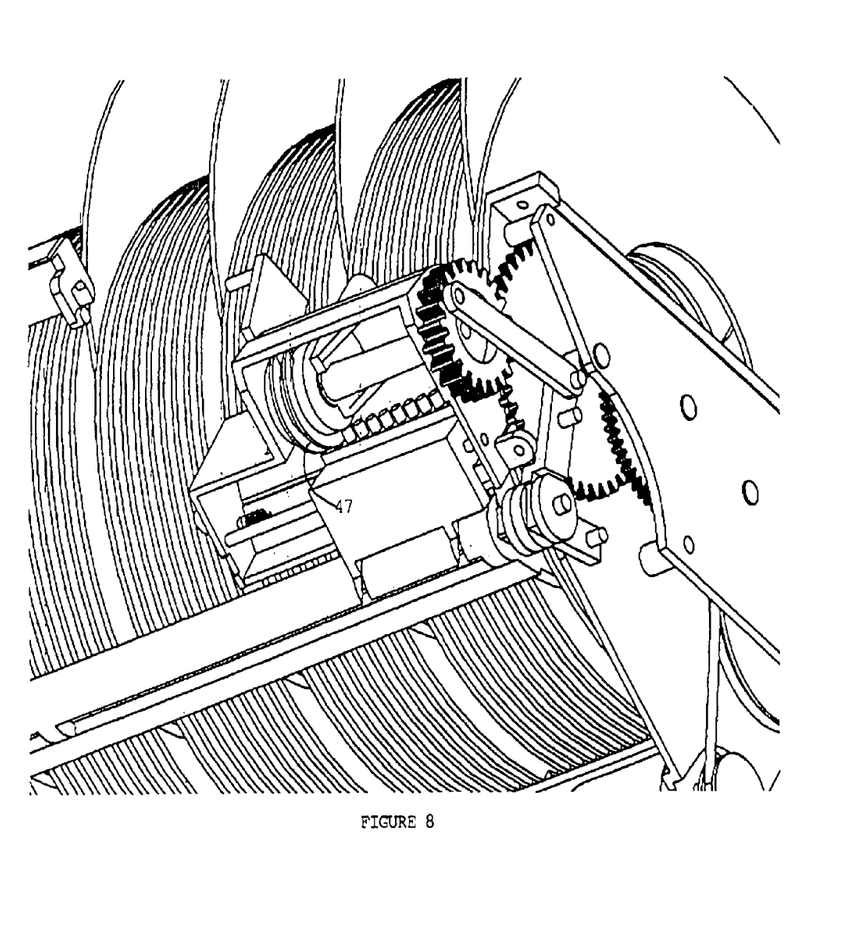

In the accompanying drawings there is depicted schematically a disc storage unit 10. The storage unit 10 is typically made from parts of moulded plastics material and comprises a case 11 to which there is hingedly connected a cover 29. The case supports an array of discs 41 in respective parallel vertical planes across which respective coaxial axes of the discs pass horizontally. The discs are maintained in this position by a tray 12 and a disc positioner 28 (see FIG. 5). The tray 12 comprises an array of arcuate slots into respective ones of which an edge of a disc is received. The disc positioner 28 comprises an array of parallel slots through each of which a disc passes.

Figure 1:
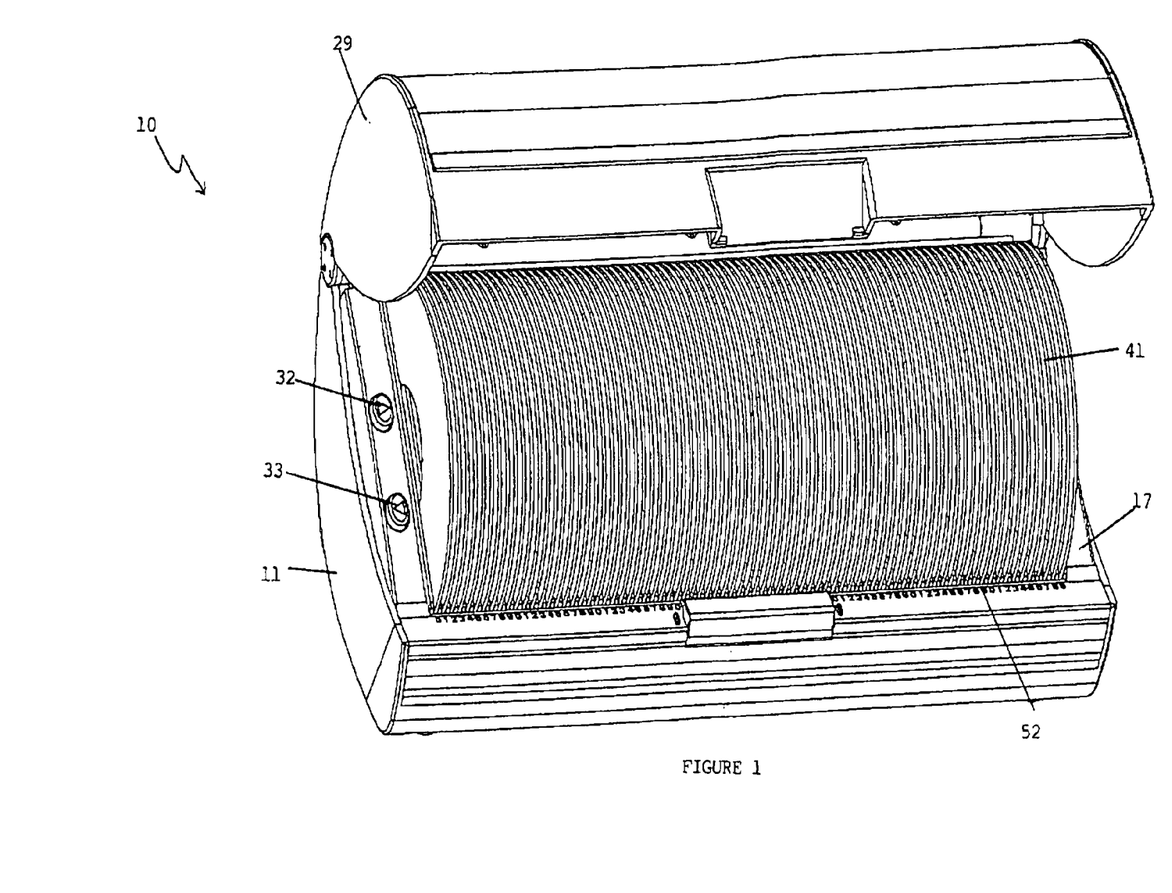
FIG. 1 is a schematic oblique illustration of a disc storage unit having its lid in an open configuration.
Figure 2:
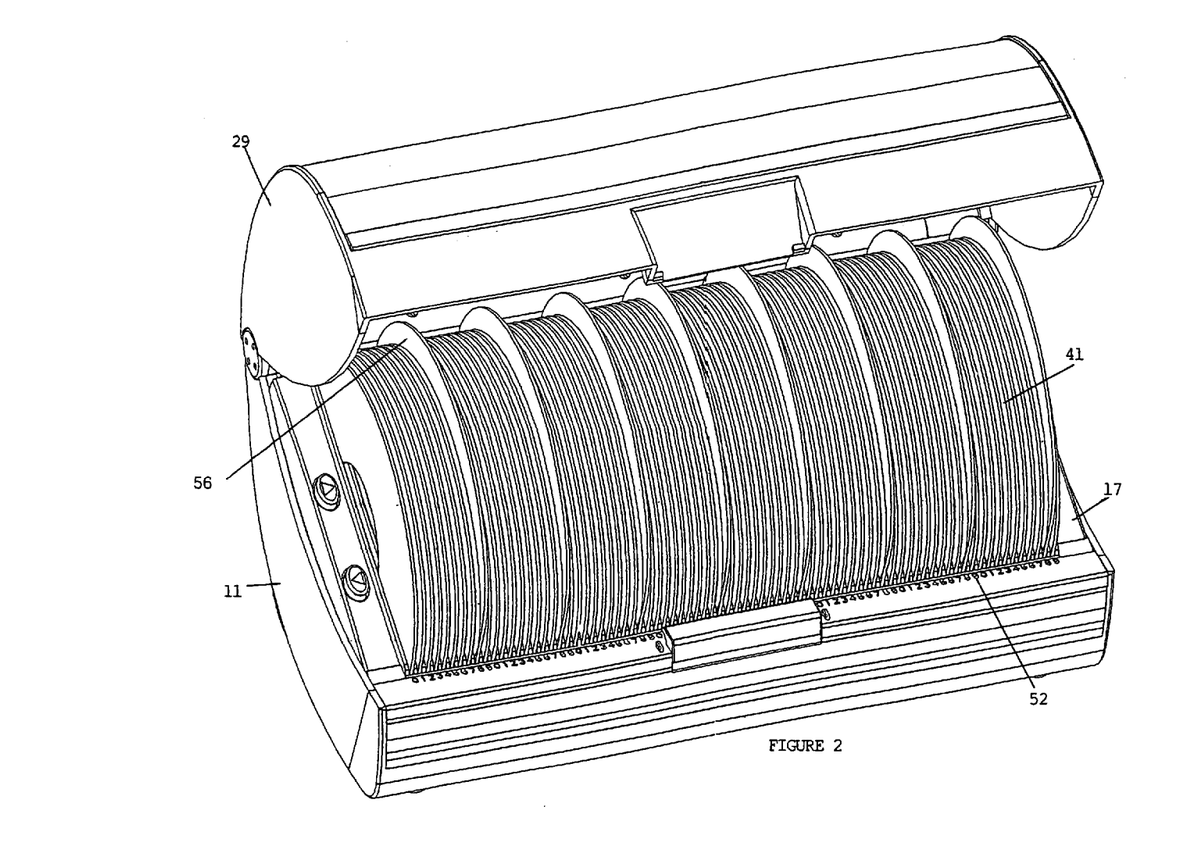
FIG. 2 is a schematic oblique illustration of the disc storage unit with its lid open and having a number of discs raised for viewing and possible retrieval.

A sequence of numerical disc-position indicia 52 extends along the front edge of the case 11 as shown in FIGS. 1 and 2.

There is provided within the case 11 a mechanism that serves to raise certain equispaced discs as shown in FIG. 2 such that edge portions 56 of the discs can be viewed for selection and retrieved by hand. The mechanism serves also to lower those equispaced discs and in sequence raise consecutive equispaced sets of discs for viewing and possible retrieval. Right or left sequence movement is achieved by momentarily pressing pushbuttons 32 and 33 respectively.

Figure 3:
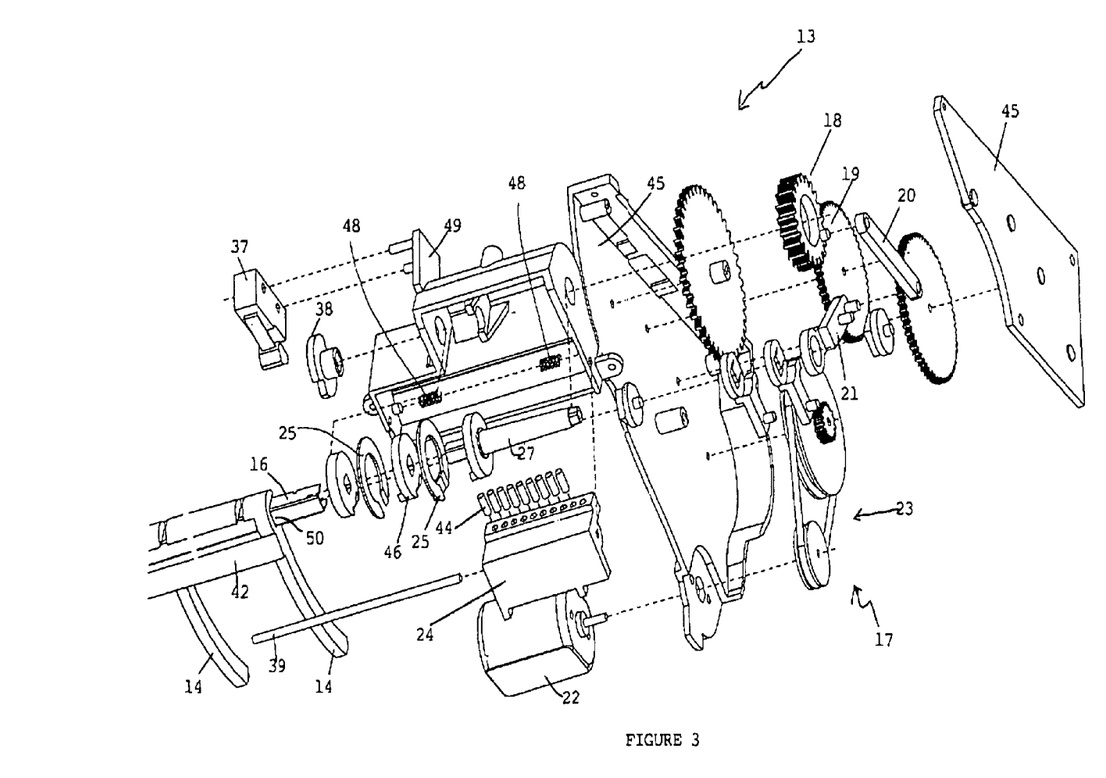
FIG. 3 is a schematic parts-exploded oblique illustration of parts of a disc-raising mechanism.
Figure 4:
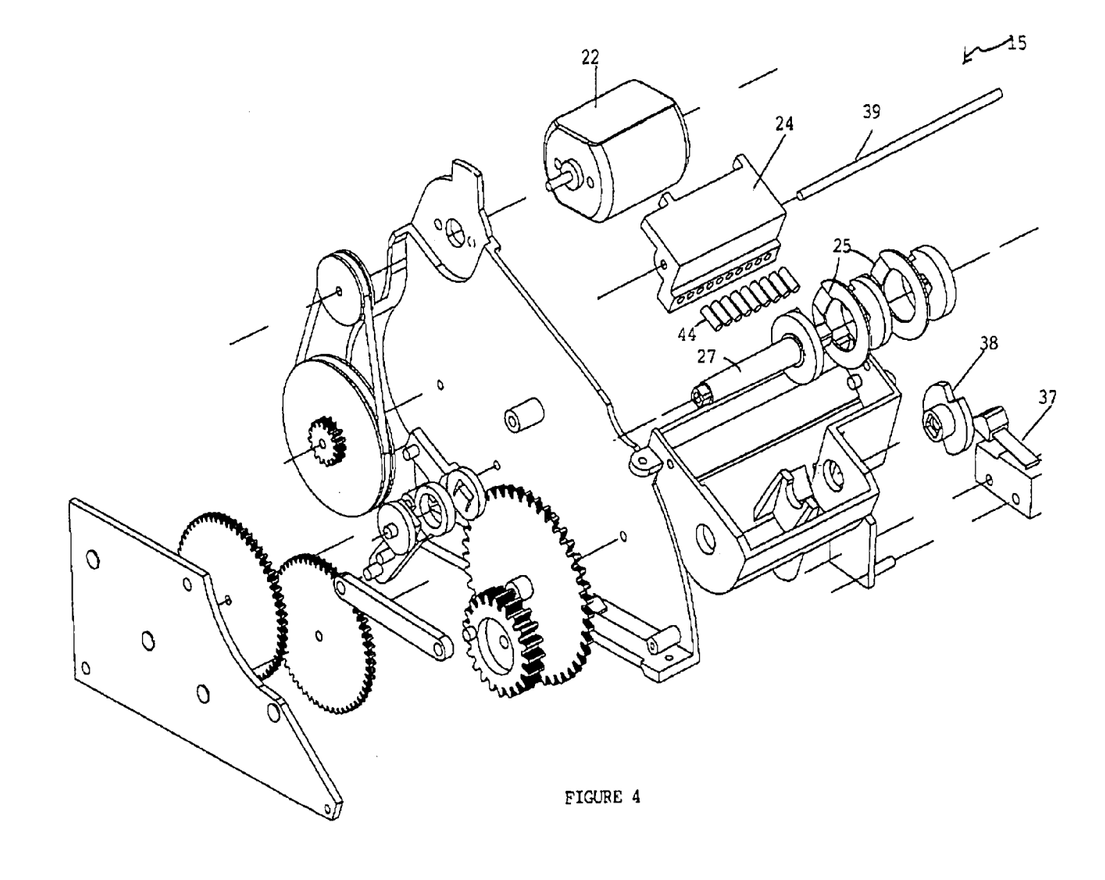
FIG. 4 is a further schematic parts-exploded oblique illustration of parts of the disc-raising mechanism.

As shown in FIG. 3, the disc raising mechanism 13 comprises a gearbox 17—drive input to which is provided by an electric motor 22 via a belt drive 23. The gearbox is designed to reduce the output speed of the electric motor 22 whilst stepping-up its torque output at output gear 18. There are two plates 45 between which the gears of the gearbox are rotatably mounted.

The output gear 18 has an eccentric pin 19 to which one end of a link 20 is attached.

The disc raising mechanism comprises a pivot bar 16 connected to a shaft 27. The shaft 27 has extending radially from it a crank arm 21 to which the other end of the link 20 is attached. The pivot bar 16 and shaft 27 are co-linear and parallel to the coaxial axes of the discs in the storage unit.

The pivot bar 16 is typically of square or other non-circular cross-section and has fitted slidably over it a carriage beam 42 from which a number of lifting fingers 14 extend. The carriage beam 42 pivots together with the pivot bar 16 by virtue of the fact that the apertures 50 in the carriage beam through which the pivot bar passes are of shape corresponding to the cross-section of the pivot bar itself (typically square). Longitudinal movement of the carriage beam 42 along the pivot bar 16 is allowed as its fit to the pivot bar is loose.

Each lifting finger 14 is curved in an arc corresponding to a segment of the disc periphery. The carriage beam 42 extends between the lifting fingers 14 and maintains rigidity of the fingers with respect to one another.

Upon rotation of output gear 18, the pin 19 causes movement of the link 20. This in turn causes rotation of the crank arm 21. The pivot bar 16 consequently rotates to cause the carriage beam 42 to rotate and the fingers 14 to move upwardly through the slots in the tray 12 to lift the discs. Upon continued rotation of the output gear 18, the link 20 draws the crank arm 21 back in the opposite direction to counter-pivot the pivot bar 16 to thereby recede the lifting fingers 14.

Figure 12:
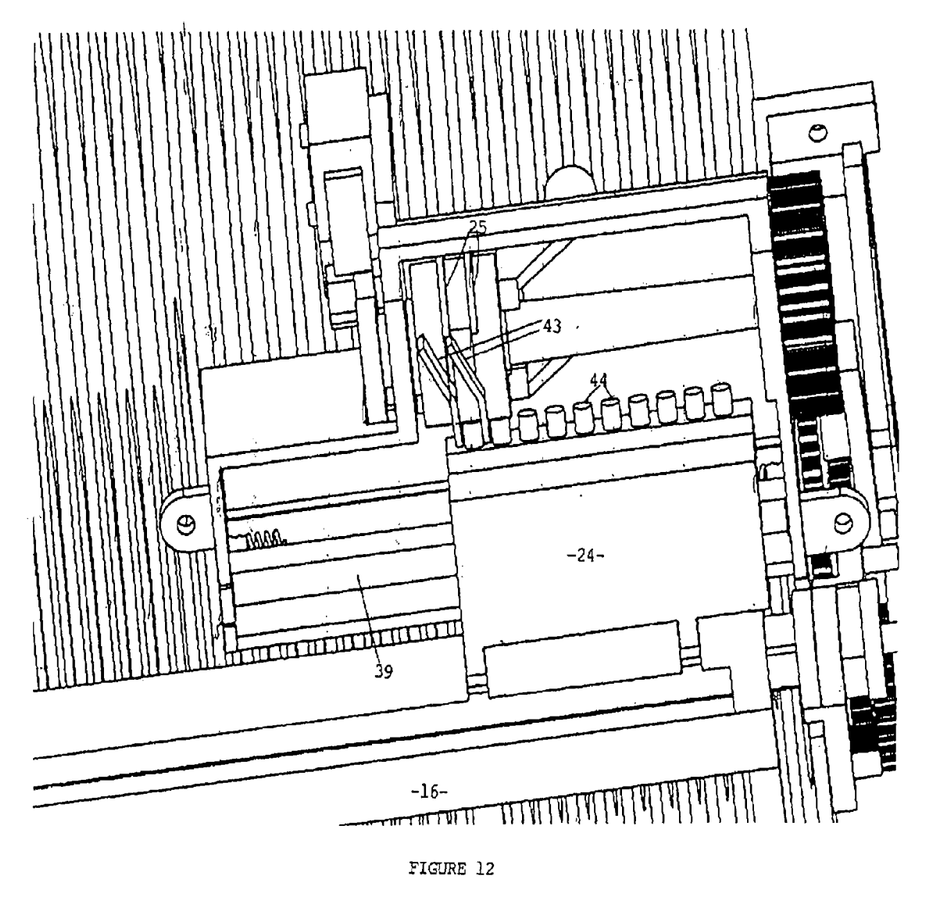
FIG. 12 is a schematic oblique illustration of the disc indexing system of FIG. 11 in another configuration.
Figure 13:
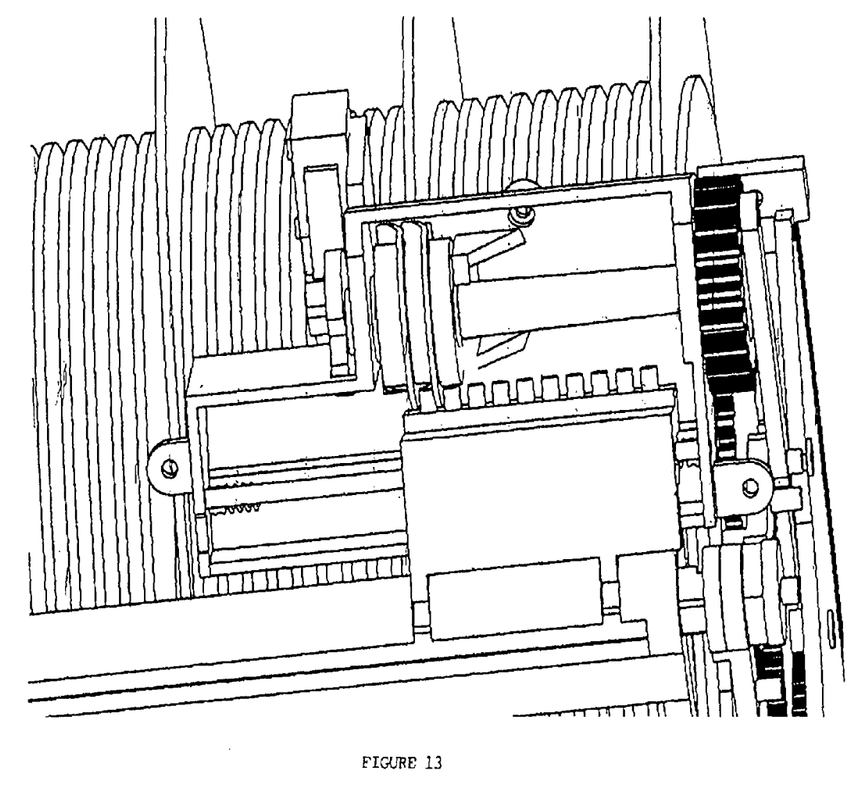
FIG. 13 is a schematic oblique illustration of the disc indexing system of FIGS. 11 and 12.

There is an indexing mechanism 15 that causes the carriage beam 42 to move along the pivot bar so that the fingers 14 move into position beneath the next set of discs to be raised. The indexing mechanism comprises a pin block 24 from which an array of fixed indexing pins 44 extend. The pin block 24 is slidably mounted upon a rod 39 that is parallel to the shaft 27. The pins 44 are directed toward the shaft 27 and co-operate with a pair of indexing rings 25. The indexing rings 25 are spaced apart by a spacer 46 so as to provide a channel 47 into which the pins can extend. As shown in FIG. 12, the indexing rings 25 each have deviations 43 against which the indexing pins 44 bear to cause the block 24 to move along the rod 39 when a pin encounters the deviation. As the block 24 is connected to the carriage beam 42, the carriage beam, together with fingers 14 shifts along to the next set of equispaced discs. The spacing between adjacent indexing pins 44 is equivalent to the disc spacing. There are springs 48 to provide an over-travel rebound mechanism at the respective opposite ends of travel of the block 24 so that one of the indexing pins 24 is always engaged between the disks.

There is a limit switch 37 affixed to a frame 49 through which the shaft 27 passes and to which the shaft 27 is mounted. At or near the junction between the pivot bar 16 and the shaft 27, there is provided a cam 38 that operates the limit switch 37. The limit switch 37 is in circuit with the electric motor 22 and a set of batteries 14 housed within the case 11 and opens/closes in accordance with the cam profile of cam 38.

Figure 9:
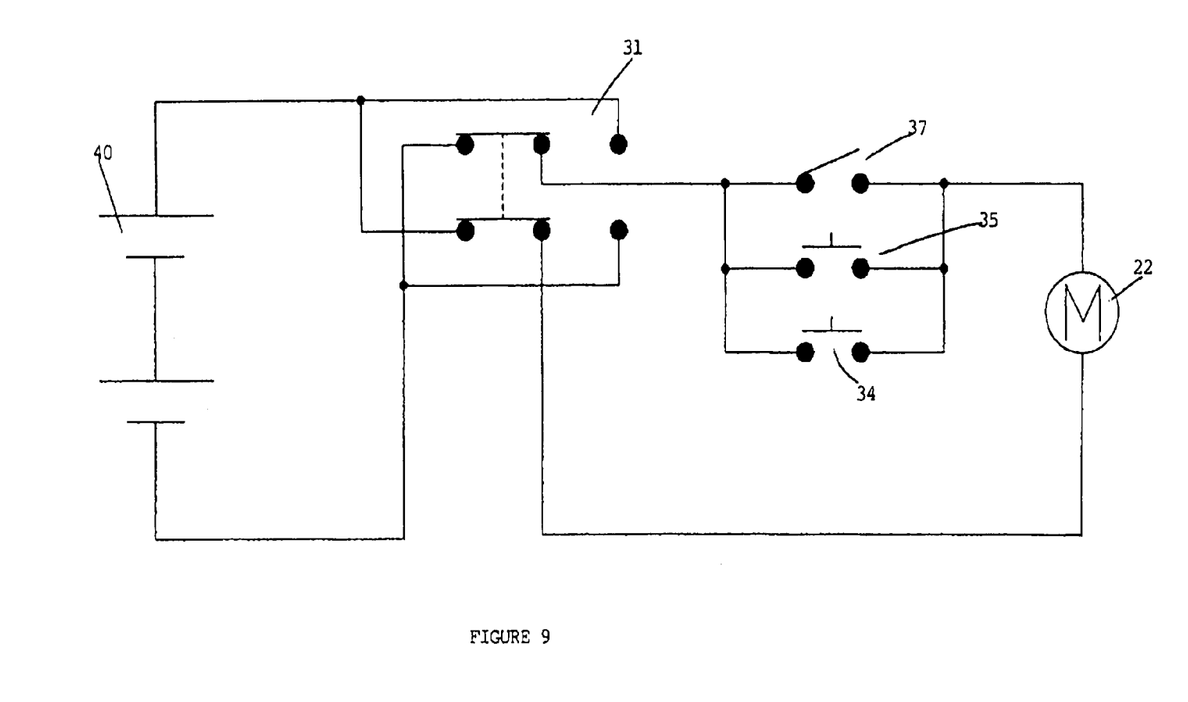
FIG. 9 is a schematic circuit diagram of a switch system associated with the disc storage unit.

The electric circuit is illustrated in FIG. 9 and includes further switches associated with a special switch mechanism 13 mounted beneath the pushbuttons 32 and 33.

Figure 10:
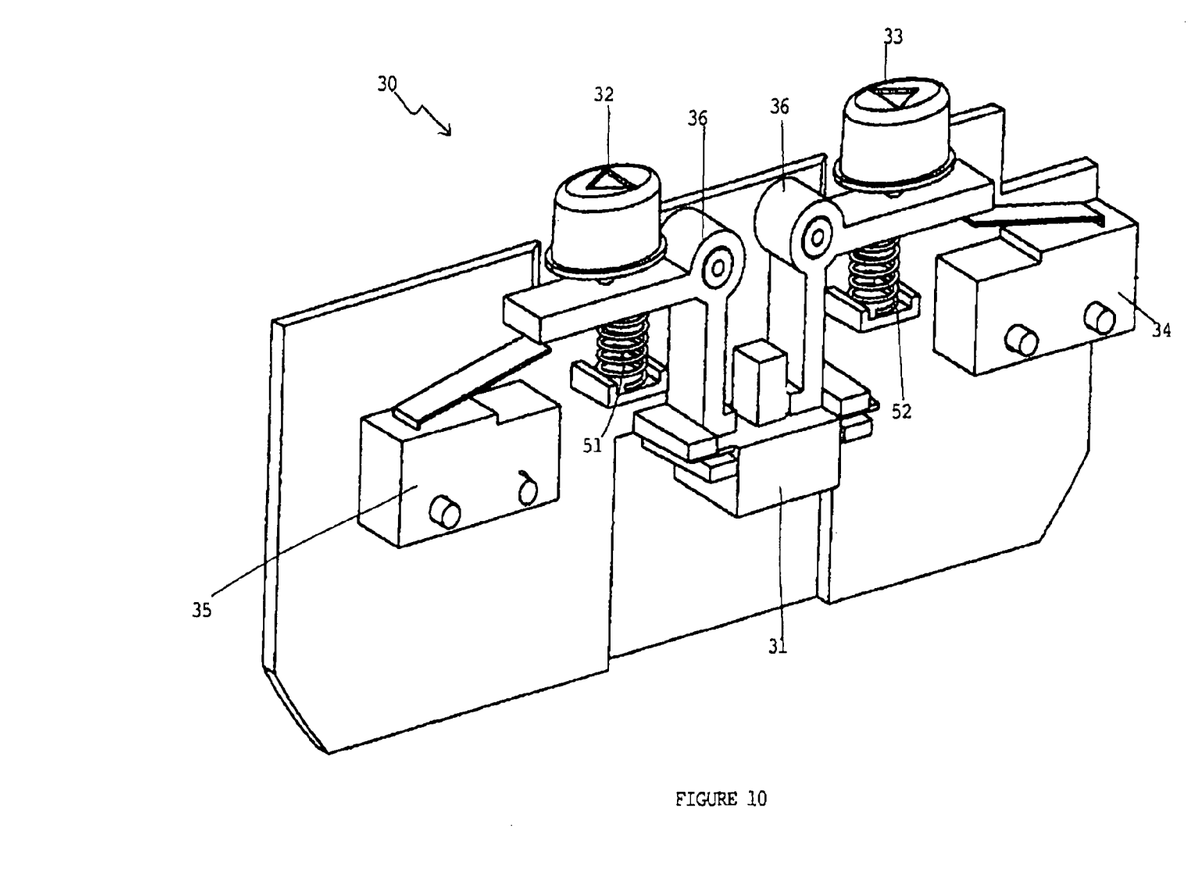
FIG. 10 is a schematic oblique illustration of the mechanical components of the switch mechanism.
Figure 11:
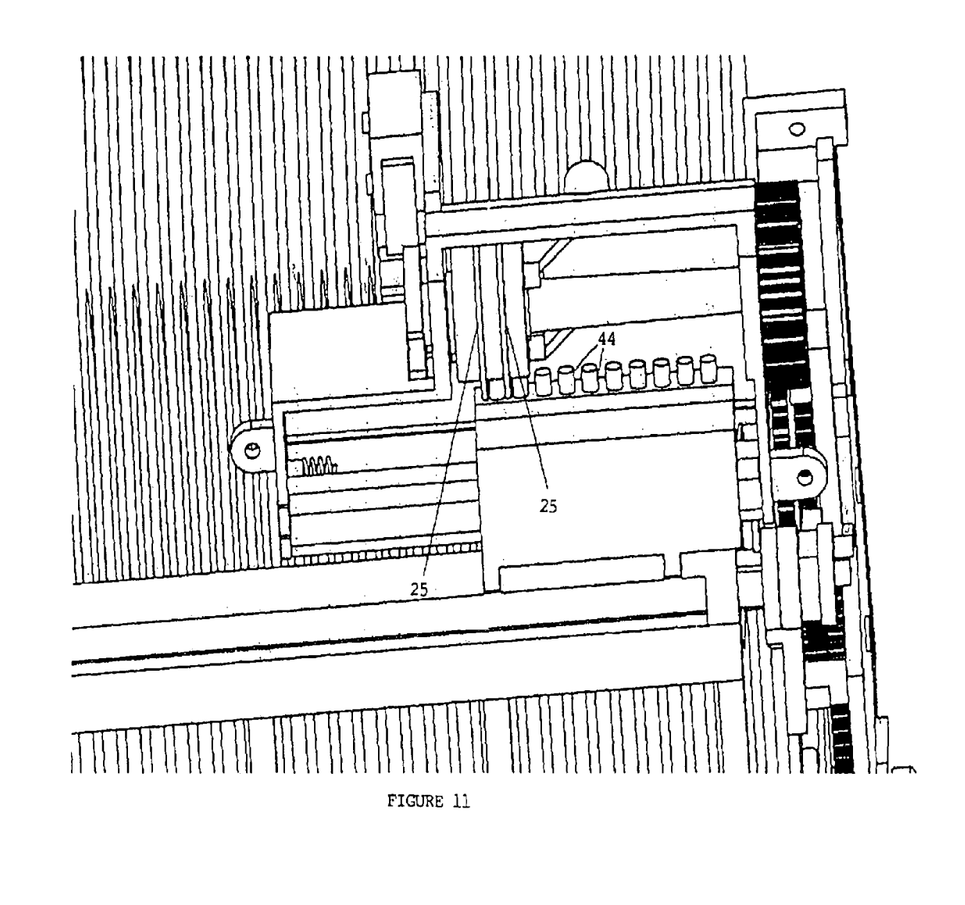
FIG. 11 is a schematic oblique illustration of a disc indexing system in one configuration.

Switch mechanism 30, as depicted in FIG. 10, comprises a pair of momentary contact switches 34 and 35 and a slide switch 31. There are elbows 36 each having arms associated with one of the momentary switches and other arms that engage the activator of the slide switch 31. When pushbutton 32 is depressed, the elbow momentarily closes switch 35 and also shifts the activator of the slide switch 31 to the right. When the pushbutton 32 is released, spring 51 acts on the elbow to return the pushbutton 32 to the raised rest position and releases the elbow from the activator of momentary switch 35. However, the activator of slide switch 31 remains in its right-shifted position. When the pushbutton 33 is depressed, the activator of slide switch 31 moves to the left as a result of action of the other elbow 36 concurrently with closure of momentary switch 34. When the pushbutton 33 is released, spring 52 returns it to a raised rest position and opens the momentary contact at switch 34. However, the activator of slide switch 31 remains left-shifted until pushbutton 32 is again depressed. User-manipulation of pushbuttons 32 and 33 results in activation of the motor 22, gearbox 17, disc raising mechanism 13 and indexing mechanism 15 in such a manner that consecutive sets of equispaced discs are raised and lowered until a desired disc is identified. To this end, edge portions 53 of the discs become visible as indicated in FIG. 2. Once identified, the user can release finger pressure from the pushbutton 32 or 33 as the case may be, and manually extract the disc. Reverse sequential disc-raising is achieved by depressing the other pushbutton.

Figure 14:
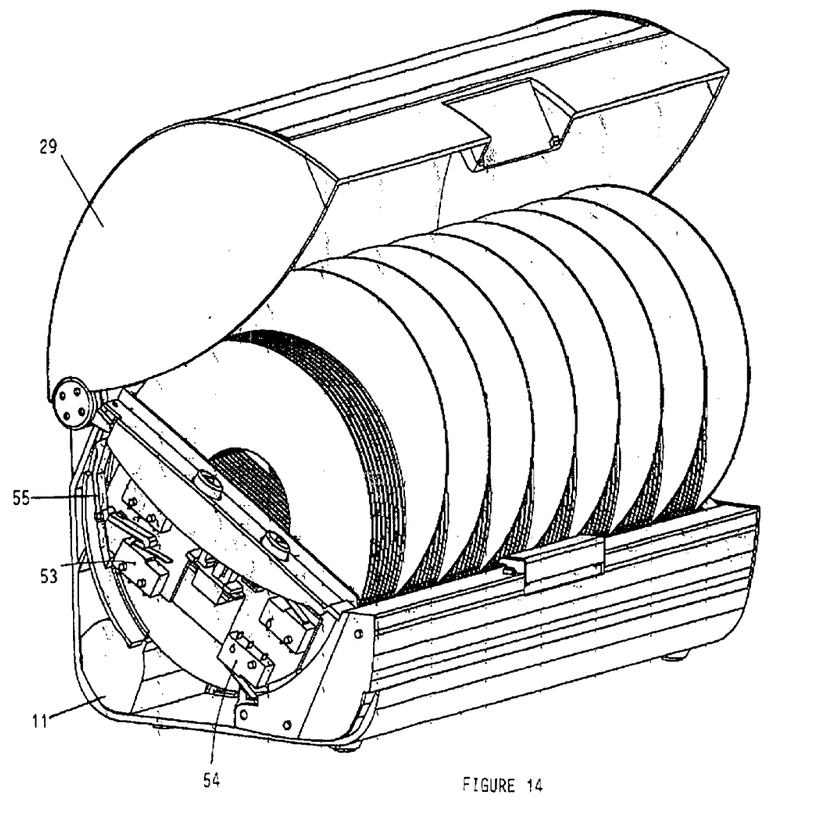
FIG. 14 is an oblique illustration of a disc storage unit having additional safety switches.
Figure 15:
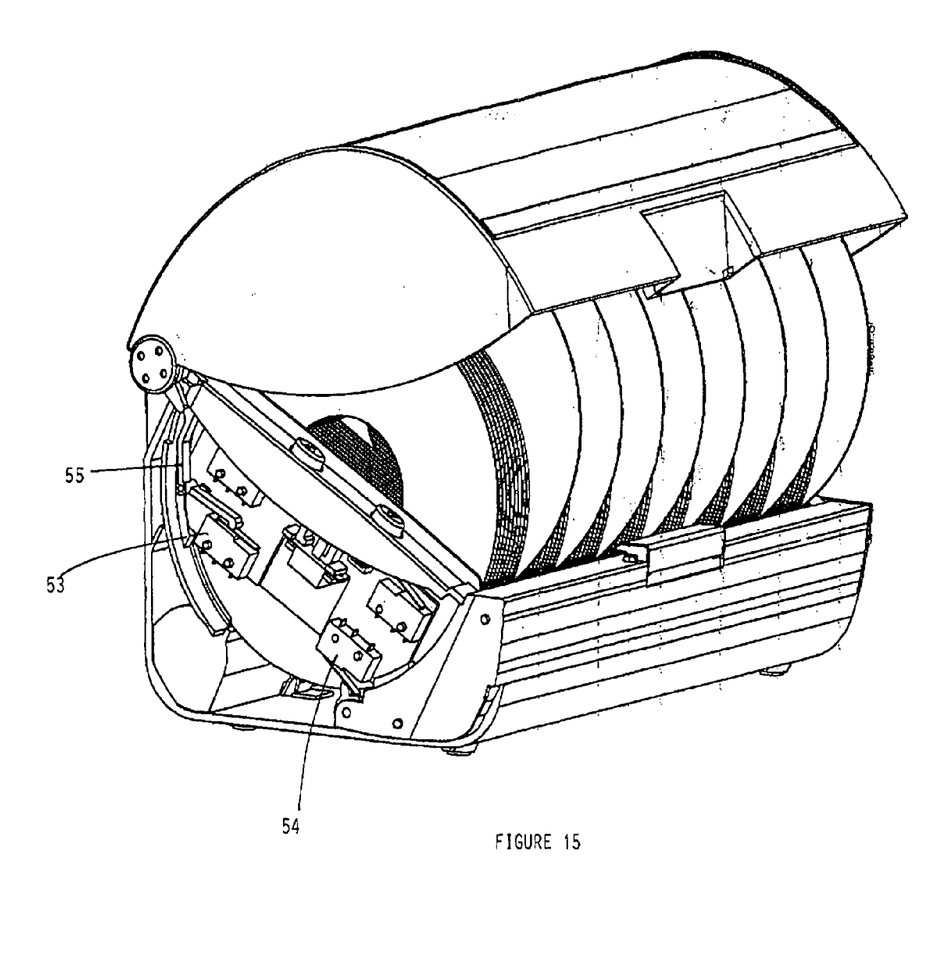
FIG. 15 is another oblique illustration of the disc storage unit of FIG. 14.
Figure 16:
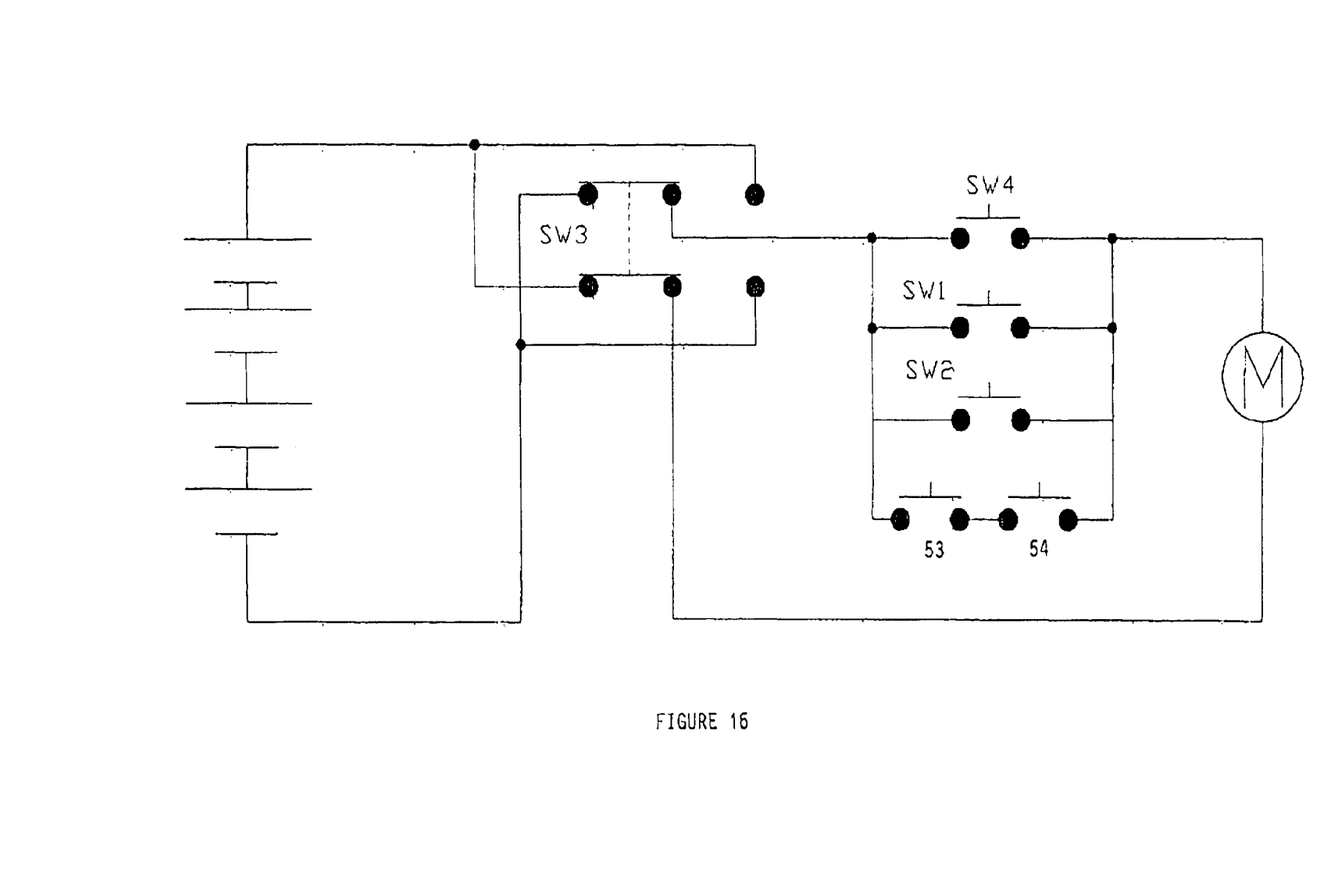
FIG. 16 is a schematic further diagram showing the additional safety switches.

The storage unit may benefit from the addition of safety switches as shown at 53 and 54 in FIGS. 14 to 16. Feasible switches act as safety switches to prevent operation of the motor if certain conditions are met. Switches 53 and 54 are connected in series. If the cover 29 is in the raised position, then switch 53 is open. To this end, there is a linkage mechanism 55 attached pivotally to the case 11 as shown in FIGS. 14 and 15 and interacting with the cover 29.

The switch 54 is activated depending upon whether or not any discs are in the raised position. If any discs are in the raised position, switch 54 is closed. If all of the discs are in the down position, switch 54 is open. The electrical configurations depicted in FIGS. 16 demonstrates that the above-described positioning of switches 53 and 54 provides a safety-operation whereby the motor cannot operate to raise the discs dependent upon certain conditions.

It should be appreciated that modifications and alterations obvious to those skilled in the art are not to be considered as beyond the scope of the present invention. For example, the cover 29 might be motorised to open and close.

The invention claimed is:

1. A disc storage unit comprising:
   a case;
   a tray supported by the case and configured to support an array of discs in respective parallel substantially vertical planes across which respective coaxial axes of the discs pass substantially horizontally;
   a disc-raising mechanism comprising:
      a plurality of fingers activatable to lift one of the discs from the tray within its respective plane to thereby render the disc non-coaxial with other discs that might be supported by the tray,
      a pivot bar having a slidably mounted carriage beam from which said fingers extend and a crank arm;
   an indexing mechanism configured to cause the disc-raising mechanism to raise others of said discs in a like manner;
   an electric motor for pivoting the pivot bar; and
   a gearbox that reduces output speed of the electric motor and drives the pivot bar, wherein the gearbox comprises an output gear having an eccentric pin to which a link is attached and said link is attached to said crank arm; and the indexing mechanism comprises a shaft extending parallel to the pivot bar and driven by the output gear, having one or more rings affixed thereto and extending thereabout, and a block interacting with the carriage beam and having a plurality of pins extending therefrom, said pins interacting with the rings to transfer the block and the carriage beam linearly along the pivot bar.

2. The disc storage unit of claim 1 wherein the block is mounted to slide upon a rod that extends parallel to the pivot bar.

3. A disc storage unit comprising:
   a case;
   a tray supported by the case and configured to support an array of discs in respective parallel substantially vertical planes across which respective coaxial axes of the discs pass substantially horizontally;
   a disc-raising mechanism comprising:
      a plurality of fingers activatable to lift one of the discs from the tray within its respective plane to thereby render the disc non-coaxial with other discs that might be supported by the tray,
      a pivot bar having a slidably mounted carriage beam from which said fingers extend and a crank arm;
   an indexing mechanism configured to cause the disc-raising mechanism to raise others of said discs in a like manner;
   an electric motor for pivoting the pivot bar;
   a gearbox that reduces output speed of the electric motor and drives the pivot bar; and
   a cam mounted on the shaft and interacting with a limit switch,
   wherein the gearbox comprises an output gear having an eccentric pin to which a link is attached and said link is attached to said crank arm; and the indexing mechanism comprises a shaft extending parallel to the pivot bar and driven by the output gear, having one or more rings affixed thereto and extending thereabout, and a block interacting with the carriage beam and having a plurality of pins extending therefrom, said pins interacting with the rings to transfer the block and the carriage beam linearly along the pivot bar.

* * * * *